Patented Feb. 18, 1947

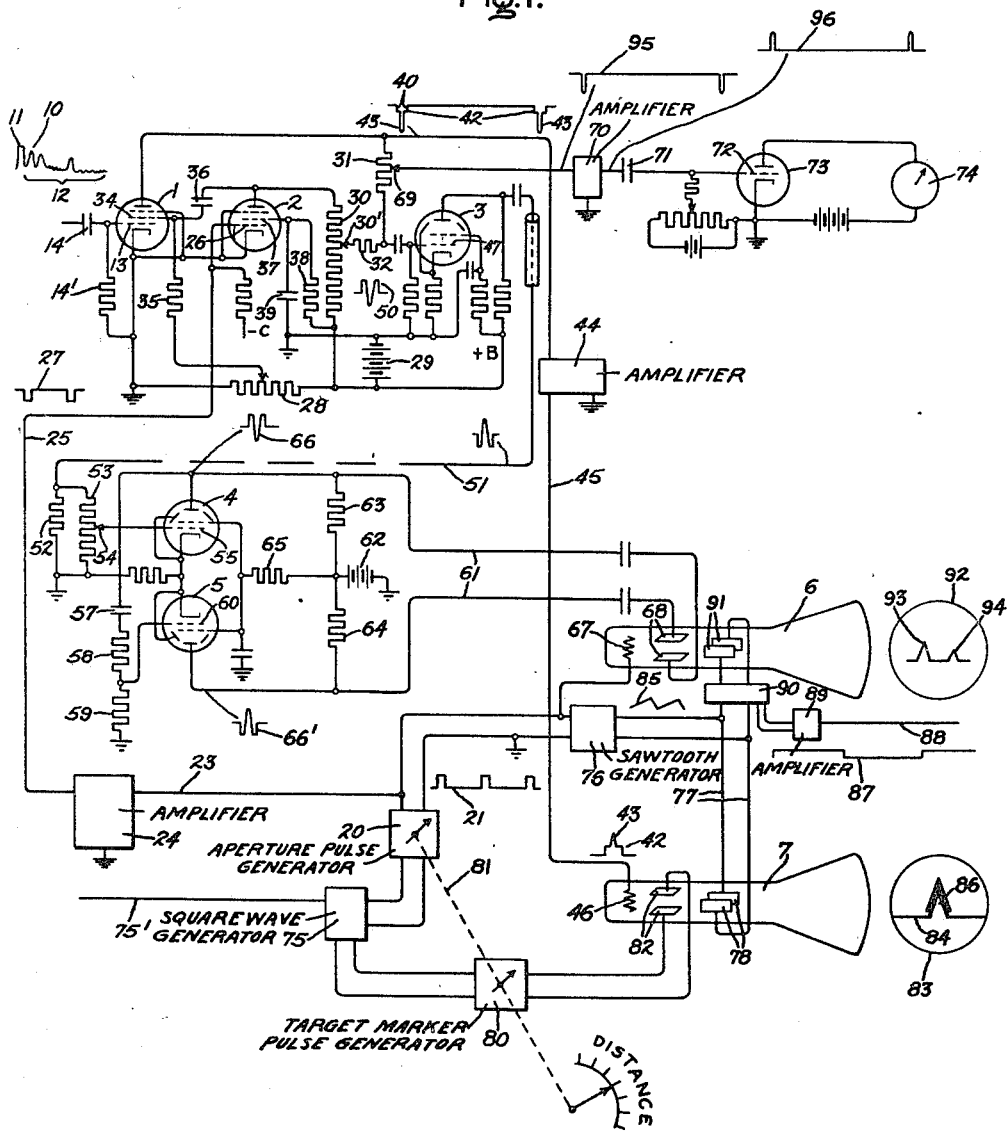

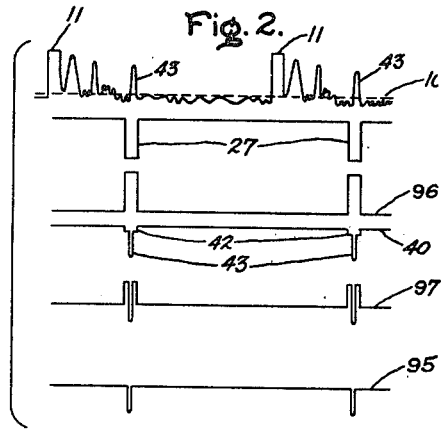
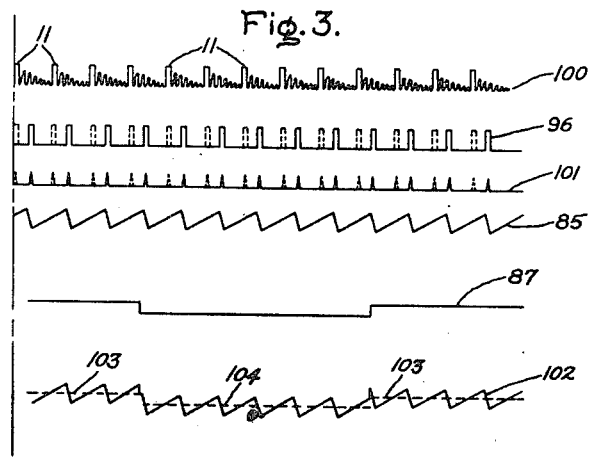
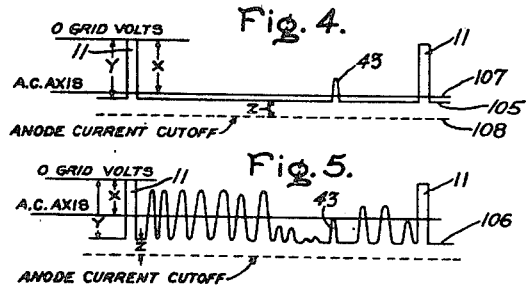
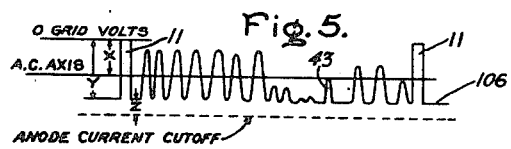
Inventor:
Franklin M. Deerhake,
by Harry E. Dunham
His Attorney.

2,416,088

UNITED STATES PATENT OFFICE 2,416,088

PULSE SYSTEM

Franklin M. Deerhake, Schenectady, N. Y., assignor to General Electric Company, a corporation of New York Application June 1, 1942, Serial No. 445,309

10 Claims. (Cl. 250—27)

My invention relates to pulse translation systems and while not limited thereto it has particular utility in the reception system of radio detection and ranging apparatus.

Commonly, in such apparatus, periodic pulses are transmitted from a point where observations are to be made and after each pulse a group of corresponding pulses, or echoes of the transmitted pulse, are received. These corresponding pulses, or echoes, as I shall herein term them, may be due to reflection of the transmitted pulse from remote objects, or they may be due to operation of apparatus mounted on such remote objects, which apparatus may respond to the transmitted pulse to transmit an "answer back" or "recognition" pulse identifying the remote object.

My invention has for one of its objects to provide improved means for translating such received pulses.

A further object of my invention is to provide improved means for selecting a desired pulse from the periodic groups of received pulses and translating the selected pulse.

Commonly in equipment of the type referred to, cathode ray apparatus is utilized to produce the requisite indications of the received echoes. A further object of my invention is to provide an improved control circuit operating in response to received echoes to produce desired operation of such cathode ray apparatus.

The novel features which I believe to be characteristic of my invention are set forth with particularity in the appended claims. My invention itself, however, both as to its organization and method of operation together with further objects and advantages thereof, may best be understood by reference to the following description taken in connection with the accompanying drawings in which Fig. 1 represents an embodiment of my invention and Figs. 2, 3, 4, and 5 represent certain characteristics pertaining to its operation.

Referring to Fig. 1 of the drawings, I have shown therein a group of electron discharge devices 1, 2, 3, 4, and 5 which are connected in the receiving channel of a radio echo system and comprise means whereby received pulses are supplied to equipment comprising certain cathode ray apparatus 6 and 7 to produce desired indications thereon. The wave representing the received pulses is indicated in Fig. 1 at 10 and comprises a series of groups of waves each having a leading pulse 11 corresponding to the transmitted pulse and a series of other pulses 12 corresponding to pulses received after each transmitted pulse, as due to deflection from remote objects or due to operation of apparatus on such remote objects. An electromotive force comprising such pulses is supplied between the control electrode 13 of discharge device 1 and cathode through a condenser 14.

In accordance with my invention, a desired one of the received pulses of each group is selected by the action of the discharge devices 1 and 2 and is thereafter supplied to the two cathode ray devices 6 and 7, and, as will later be explained, to meter 74. The means whereby this selection is effected comprises a pulse generator 20 generating positive periodic pulses 21 having the same frequency as the transmitted pulses and variable in time phase relative thereto. These pulses are of very short duration compared with the interval between radiated pulses and define the interval, or aperture, of time during which the selected impulses are received and applied to the indicating apparatus. I therefore refer to these pulses as aperture pulses.

These aperture pulses are supplied over a conductor 23 to an amplifier 24, the output of which is supplied over conductor 25 to the control electrode 26 of discharge device 2. These pulses are supplied to this control electrode in negative sense as indicated at 27.

The cathodes of the two discharge devices 1 and 2 are connected together and grounded. The anode of the discharge device 2 is connected to the positive terminal of this source of operating potential 29 through a resistance 30 and the anode of discharge device 1 is connected through resistances 31 and 32 to a variable point on the resistance 30. The screen grid 34 of discharge device 1 is connected to a point of positive potential on resistance 28 through a resistance 35 and it is coupled through a condenser 36 to the anode of discharge device 2. The screen grid 37 of discharge device 2 is connected to the positive terminal of the source of potential 29 through resistance 38 and is connected to ground through the usual condenser 39.

Normally no current flows in the anode circuit of discharge device 1 because of the low potential between the screen electrode 34 and cathode. This potential is negative with respect to the cathode during the period between aperture pulses. Therefore, the received signal is not normally reproduced in the anode circuit of this device.

The discharge device 2 normally passes a substantial anode current through the resistance 30. This anode current through resistance 30 is of course materially reduced during the period of the negative pulses 27 on the grid electrode 26 thereof. This reduction in anode current causes an increase in anode potential of the discharge device 2 and thus positive pulses are supplied through condenser 36 to the control electrode 34 of the discharge device 1. This positive pulse causes anode current to flow in discharge device 1 during the period of the pulse. Thus during the period of each of the pulses 27 increased anode current flows in the discharge device 1 and of course during this period such current is modulated by the received signal applied to the control electrode 13. The increased current in discharge device 1 during the period of the aperture pulse produces a drop in potential on resistances 31, 32, and the lower portion of resistance 30, as indicated by the square shouldered portion 40 of the pulses indicated at 42. Since the signal is applied to the grid in positive sense it produces an additional increase in current during pulses 40, this additional increase being indicated at 43. Thus the potential wave at the anode of the discharge device 1 is that indicated at 40, 42, and 43

It will be observed from this wave that the entire received signal between aperture pulses is eliminated and that only the aperture pulse and signals received during the aperture pulses are reproduced upon the resistance 31. These pulses are supplied through an amplifier 44 by which they are reversed in polarity and supplied over conductor 45 to the control electrode 46 of a cathode ray device 7. They are supplied to this device in positive sense and operate to turn on the beam of the cathode ray device during the interval of the aperture pulse and control its intensity in accordance with the signal received during the aperture pulse.

As previously stated the negative aperture pulses 27 applied to the control electrode 26 of discharge device 2 produce a reduction of current therein and hence increase the potential at the anode terminal of resistance 30. Thus the anode terminal of resistance 30 tends to become more positive during the aperture pulse as the anode terminal of resistance 31 tends to become less positive during the aperture pulse. Resistance 32, which is in series with resistance 31, is connected by means of a variable tap 30' to resistance 30 and the position of this tap and the value of resistance 32 are so chosen that the control electrode 47 of discharge device 3 is varied in potential in the positive direction during the aperture pulse. However, this potential on the control electrode 47 is affected by the variation in current through resistances 30 and 32 produced by the signal applied to the grid of discharge device 1, this variation tending to reduce the potential on the grid of discharge device 3 with increase of potential on electrode 13 of device 1. Thus the potential variation on the grid of discharge device 3 during the aperture pulse and in the presence of a signal may be that indicated at 50 on the drawing. This wave is, of course, reproduced in the anode circuit of the discharge device in the opposite sense and is supplied over conductor 51, which may be a concentric transmission line of some considerable length, to a resistance 52 terminating the transmission line. Across resistance 52 is connected a potentiometer 53 having a variable tap 54 connected to the control electrode 55 of a discharge device 4. Between anode and ground of this discharge device is connected a circuit comprising capacitance 57 and resistances 58 and 59 from which potential is supplied to the control electrode 60 of discharge device 5, this potential, of course, being in opposite phase to that applied to the control electrode 55 of discharge device 4. Thus discharge devices 4 and 5 operate in push-pull relation, their anodes being connected symmetrically with respect to a load circuit 61. Anode operating potential is suplied to each of the discharge devices from a source 62 through resistances 63 and 64 respectively. This potential is also supplied to the screen electrodes of the discharge devices through a resistance 65. The potentials on the opposite conductors of the circuit 61 may have variations therein of the form indicated at 66 and 66' in Fig. 1. These potentials may be supplied between a pair of deflection plates 68 of a cathode ray discharge device indicated at 6, for example, thereby to control the deflection of the beam of the cathode ray device in the vertical direction.

Referring again to the resistance 31, it will be observed that the potential on this entire resistance varies in the less positive direction in response to the signal received during the aperture pulse. The anode terminal of the resistance varies in the less positive direction in response to the aperture pulse itself and the opposite terminal varies in the more positive direction in response to the aperture pulse. Thus at an intermediate point on this resistance the aperture pulse is absent altogether. Variable tap 69 may be connected to such a point to supply the signal appearing thereat, free from any variations in accordance with the aperture pulses, through an amplifier 70 and condenser 71 to the control electrode 72 of a discharge device 73, the latter of which may operate as a peak voltmeter, for example, to measure the peak intensity of the signal received during the apertre pulse. This peak intensity may be indicated upon a meter 74. The wave 95 represents this signal as it appears at the input to amplifier 70 and curve 96 represents it after being reversed in phase or polarity by amplifier 70.

Cathode ray devices 6 and 7 may, for example, comprise the indicating devices of an echo range and direction determination system in which these devices are controlled by received echoes for translation in the manner previously described. The additional means required for the control of these discharge devices is shown schematically and may comprise a generator 75 of square wave pulses, which are synchronized, by means of potentials transmitted over conductor 75', with the radiated pulses. The square waves produced by the generator 75 are supplied to the aperture pulse generator to synchronize those pulses with the radiated pulses. The aperture pulse generator 20 also includes means whereby the phase relation between these aperture pulses and the radiated pulses may be varied. That is, these aperture pulses 21 may be made to occur either simultaneously with the radiated pulse or during any desired subsequent interval. Thus they may be made to occur during reception of any particular echo.

These pulses 21 are supplied to a saw-tooth wave generator 76 which generates saw-tooth waves having the frequency of the pulses 21. These saw-tooth waves are supplied over circuit 77 between the horizontal deflection plates 78 of the cathode ray discharge device 7, and through amplifier 90 between the horizontal deflection plates 91 of cathode ray device 6, whereby the cathode rays of these devices are deflected across the viewing screen thereof during the aperture pulse.

Rectangle 80 represents apparatus for generating a pulse of much shorter duration than the aperture pulses 21 but which occur during the aperture pulses 21. These pulses may be termed target marker pulses for reasons presently to appear. These pulses produced by the generator 80 are controlled in phase with respect to the radiated pulses simultaneously with the aperture pulses 21 by a suitable unicontrol means indicated by the dotted line 81. These target marker pulses are supplied by the generator 80 between the vertical plates 82 of the discharge device 7 whereby they produce a deflection of the beam in the vertical direction during an intermediate portion of the aperture pulse.

The signal modulated aperture pulses, previously mentioned, are supplied from the anode of discharge device 1 through amplifier 44, and conductor 45 to the control electrode 46 of the cathode ray device 7, turning the cathode ray on during the aperture pulse and modulating its intensity in accordance with the signal received during the aperture pulse. Thus a signal is produced on the viewing screen of the cathode ray device which may be that represented in the circle 83 just at the right of the cathode ray device 7. The horizontal line 84 represents the horizontal deflection produced by the saw-tooth wave 85 generated by the apparatus 76 and the inverted V-shaped deflection 86 may be that produced by the target marker pulses generated by the equipment 80. A part of the line 84, 86 is indicated as heavier than the remaining part and may be taken to represent that part of the deflection of the beam which occurs during the received signal when the beam is rendered more intense by the received signal. Of course, this more intensely illuminated portion of the deflection may occur at any part of the line 84, 86 dependent upon the time in the aperture pulse when the received echo arrives. By variation of the unicontrol member 81, however, the time of occurrence of the aperture pulse and target marker pulse may be varied to such a position in time that the received echo occurs simultaneously with the target marker pulse within the duration of the aperture pulse. Thus the brightly illuminated portion of the line 84, 86 may be made to be bisected by the vertex of the inverted V-shaped deflection 86. The adjustment of member 81 necessary to bring this effect about is a criterion of the distance to the remote object producing the echo. This adjustment may then be read from a suitable dial associated with the unicontrol member 81 which may, if desired, be calibrated in terms of distance. The cathode ray device 6 may be one utilized for the purpose of indicating the direction to the remote object producing the selected echo. The radiated pulses may be radiated from or received by an antenna having variable directivity and the directive axis of which is alternated between two different positions in a desired plane, as, for example, the vertical plane or horizontal plane. Means, not shown, may be provided to produce a square wave, such as that indicated at 87, which may be supplied over a circuit 88, and amplifier 89 to equipment 90 for controlling the discharge device 6. This square wave may have the frequency of alternation of the directive axis of the antenna, sixty cycles for example, so that the received echo is received with the antenna axis in one position during the positive pulse of the wave 87 whereas it is received with the directive axis of the array in a different position during the negative portion of the square wave. The saw-tooth wave 85 generated by the apparatus 76 is also supplied to the equipment 90. This equipment 90 may comprise an amplifier to the input electrodes of which both of the waves 87 and 85 are supplied. The wave 87, however, may be of a 60 cycle frequency whereas the wave 85 is of much higher frequency. The result is that the saw-tooth wave, as reproduced in the anode circuit of the amplifier of equipment 90, oscillates about one value of anode potential during the positive portion of the square wave 87 and about a different value of anode potential during the negative portion of the square wave 87. These potentials are supplied between the horizontal deflection plates 91 of the cathode ray device 66. The result is that the cathode ray of device 6 is deflected horizontally across its viewing screen 92, first about one center during the positive portion of the square wave 87, and then about a different center during the negative portion of the square wave 87.

As previously mentioned, the aperture pulses 66 and 66', modulated by the received signal, are supplied over circuit 61 between the vertical deflection plates of the apparatus 6 and produce the two vertical deflections 93 and 94, the deflection 93 being produced by the echo received when the axis of the antenna array is in one position in the particular plane and the deflection 94 being produced when the directive axis of the array is in a different position in the particular plane. The heights of these deflections 93 and 94 are, of course, dependent upon the intensity of the signal received during the aperture pulse and the result is that a comparison of the heights of these deflections is indicative of the direction from which the received pulses arrive.

The equipment as thus described is particularly efficacious in the control of cathode ray apparatus for the purposes indicated in which it is highly important that the various pulses be shaped as previously described. For example, the wave 50, which appears upon the control electrode 47, varies both positively and negatively with respect to a fixed value of potential. Of course the magnitude of the excursions in the positive sense is predetermined by adjustment of the apparatus, this excursion being in accordance with the aperture pulse. The excursion in the negative sense is determined by the intensity of the received echo and may, of course, vary in magnitude. However, by the means provided, these excursions may be such that the discharge devices 4 and 5, which operate in push-pull, may be biased about midway of their anode current-grid voltage characteristic so that the entire range of anode current variation may be utilized. This greatly improves the efficiency of operation of these devices and increases the magnitude of the signal which may be utilized to produce the vertical deflection of the beam in the cathode ray device 6.

Since the pulse wave 40, 42 and 43 is utilized not only to turn the cathode ray of device 7 on, but also to modulate its intensity in accordance with the signal, the variations in accordance with the signal must be in the same sense as the variations in accordance with the aperture pulse as shown by the wave 40, 42, 43. In accordance with my invention, however, these two waves, namely that indicated at 50 and that indicated at 40, 42, 43 are derived from different points on the same resistance 31 and, in addition, a third wave representative only of the received signal is derived from a third and intermediate point on this same resistance. This wave is indicated at 95 and 96 as it appears before and after the amplifier 70.

Fig. 2 represents certain curves corresponding to the waves appearing upon respective portions of the circuit of Fig. 1 drawn on the same time axis. The received signal may be that indicated at 10 in which the pulses 11 correspond to the radiated pulses and that portion of the wave between pulses 11 may correspond to electromotive force received during the intervals between the radiated pulses and which may be produced either by reflection from remote objects or by apparatus mounted upon such remote objects.

Curve 27 represents the aperture pulses as they are applied in negative sense to the control grid 26 of the discharge device 2. These pulses are shown phased with respect to the pulses 11 of curve 10 to coincide with the pulse 43 of the curve 10 which may be a pulse corresponding to a received echo.

The aperture pulse appears upon the anode of discharge device 2 in reversed polarity as indicated by the curve 96. This wave is applied through condenser 36 to the control grid 34 of device 1 and is thus mixed with the received signal and reproduced upon the anode of discharge device 1 in the form indicated by the wave 40 of Fig. 2 in which the aperture pulses are indicated by the square shouldered variations 42 and the received signal by the variations 43. Electromotive forces received at intervals between the aperture pulses, of course, do not affect the shape of this wave.

The wave 97 of Fig. 2 represents the potential which appears upon the control electrode 47 of discharge device 3. Here the pulse is in a positive, and opposite, sense to the aperture pulse of curve 40. Also the signal variation of curve 97 is opposite to the aperture pulse variation whereas in the curve 40 the two variations are in aiding relation.

The wave 95 represents the potential at an intermediate point on the resistance 31 where the aperture pulse does not appear and the entire variation is produced by the received signal.

Fig. 3 represents certain characteristics pertaining more particularly to the echo system in which the invention is utilized. Curve 100 represents the radiated pulses 11 with received pulses indicated intermediate these radiated pulses 11. Full line curve 96 corresponds to the curve 96 of Fig. 2 and represents the aperture pulse wave. This aperture pulse wave 96 is indicated by the dotted lines to be variable in phase from the position in which the dotted line pulses appear to the full line positions, and further if desired.

This phase variation is of course produced by variation of the member 81 of Fig. 1.

Full line curve 101 represents the target marker pulses produced by the equipment 80, these pulses being likewise variable in phase through the range from the dotted line positions to the full line positions and beyond if desired, but these pulses always occur during the aperture pulses of wave 96 and at as nearly a fixed time within said pulses as is practical within manufacturing considerations.

The wave 85 corresponds to the wave 85 of Fig. 1 and is the saw-tooth wave which produces the horizontal deflection of the beam in both cathode ray devices 6 and 7. It is variable in phase with the waves 96 and 101.

The wave 87 is the square wave which may be generated in synchronism with the alterations of the directive axis of the antenna array, the positive portions thereof occurring when the axis is in one position in a particular plane and the negative portions occurring when the axis is in a different position in that plane. These waves 85 and 87 are combined in the equipment 90 to produce the wave 102. This wave 102 comprises the saw-tooth wave oscillating first about an axis 103 and then about an axis 104 and then again about the axis 103, etc. The oscillation about the axis 103 occurs when the directive axis is in one position in the particular plane and that about the axis 104 occurs when the directive axis is in a different position in that plane. This wave is applied between the horizontal plates 91 of the cathode ray device 6. Thus the two deflections 93 and 94 are produced by echoes received from the same distant object when the directive axis of the array is in different respective positions corresponding to these deflections.

Figs. 4 and 5 represent certain additional characteristics pertaining to the equipment of Fig. 1 and which are important in the operation of my invention. It is important to the operation of my invention that the anode potential variations of discharge device 1 produced by the received signal during the aperture pulses, occur with respect to a fixed value of anode potential. That is, it is important that this fixed value be not varied by the intensity of that portion of the total received signal which is received at times between the different aperture pulses. The curves of Figs. 4 and 5 represent the operation of the equipment to maintain constant the anode voltage with respect to which the signal variation in the anode circuit occurs irrespective of the signal intensity at times between aperture pulses.

The curves of Figs. 4 and 5 represent two different extreme conditions. The curve 105 of Fig. 4 represents a received signal comprising pulses 11, which correspond to the radiated pulses and a single received echo 43, there being no other received pulses or electromotive force. The curve 106 of Fig. 5 is a corresponding curve having pulses 11 corresponding to the radiated pulses, and echo 43 of the same magnitude as the echo 43 of the curve 105 but also having numerous other received pulses during the intervals between the pulses 11 and 43.

In accordance with my invention the pulses 11 are of a constant amplitude, these pulses having been limited to a constant amplitude by limiters in the signal receiving channel prior to the equipment illustrated in Fig. 1. Condenser 14 of Fig. 1 and resistance 14' are proportioned to produce peak rectification of the pulses 11 whereby a bias potential is produced upon the grid of the discharge device having a value substantially equal to the amplitude of the pulses 11, this value being indicated at Y in Figs. 4 and 5. The alternating current axis of the curve 105 is represented by the line 107 bearing the legend "A.-C. axis," this line being the line which divides the areas between it and the curve 105 equally on each side. Dotted line 108 represents negative voltage on the grid of the discharge device corresponding to zero anode current. This line bears the legend "Anode current cut-off." This value of voltage represented by the line 108 is more negative than the most negative portion of the wave 105 by the amount Z, this amount Z corresponding to the anode current with respect to which the variation corresponding to echo 43 occurs.

In Fig. 5 the pulse 11 is, of course, of the same intensity as in Fig. 4, and similarly the bias Y on the grid of the discharge device is equal to the value indicated in Fig. 4. However, because of the increased signal intensity at intervals between pulses 11 and 43, the alternating current axis is moved upward so that the value X of voltage between the alternating current axis and the zero grid voltage is smaller than before. Since the value of voltage on the grid at which rectification occurs is fixed and determined by the characteristics of the discharge device and since the value Y remains constant, the value Z also remains constant. The result is that the variation of anode voltage produced by the echo 43 occurs with respect to a value of voltage which is unaffected by pulses received during intervals between aperture pulses. In other words, the pulses of constant amplitude 11 together with the adjustment for their peak rectification ties the base of the echo variation 43 to a fixed point on the anode current grid voltage characteristic of the discharge device.

While I have illustrated a particular embodiment of my invention, it will, of course, be understood that I do not wish to be limited thereto since various modifications may be made both in the circuit arrangement and in the instrumentalities employed, and I contemplate by the appended claims to cover any such modifications as fall within the true spirit and scope of my invention.

What I claim as new and desire to secure by Letters Patent of the United States, is:

1. The combination, in a pulse translator, of an impedance, a source of potential and a modulation device connected in series, means to supply the pulse wave to be translated to said modulation device thereby to produce pulse modulations of potential on said impedance, and means whereby said pulse modulations appear as modulations in opposite sense at different points on said impedance between said source and said modulation device.

2. The combination, in a pulse translator, of an impedance, a source of potential and a modulation device connected in series, means to supply the pulse wave to be translated to said modulation device thereby to produce pulse modulations of potential on said impedance, and means whereby said pulse modulations appear as modulations in opposite sense at different points on said impedance between said source and said modulation device, and are absent at a point on said impedance intermediate said different points.

3. The combination, in a pulse translator, of an impedance, a source of potential and a modulation device all in series, means to supply to said modulation device two pulse waves to be reproduced as potential modulations on said impedance, and means to reproduce said two pulse waves, one of said pulse waves being reproduced as modulations in opposite sense at different points on said impedance and the other being reproduced as modulations in the same sense at said different points.

4. The combination, in a pulse translator, of an impedance, a source of potential and a modulation device all in series, means to supply to said modulation device two pulse waves to be reproduced as potential modulations on said impedance, and means to reproduce said two pulse waves, one of said pulse waves being reproduced as modulations in opposite sense at different points on said impedance and the other being reproduced as modulations in the same sense at said different points, and means to produce said second pulse wave at a third point on said impedance and to eliminate modulation in accordance with said first pulse wave from said third point.

5. The combination, in a pulse translator, of an electron discharge device having an anode circuit, means to supply to said electron discharge device a wave comprising square pulses and a second wave whereby said square waves are reproduced in said anode circuit modulated with said second wave, and means to produce said square wave and said modulations in like sense at one point of said anode circuit and in unlike sense at another point of said anode circuit.

6. The combination, in a pulse translator, of an electron discharge device having an anode circuit, means to supply to said electron discharge device, a wave comprising square pulses and a second wave whereby said square waves are reproduced in said anode circuit modulated with said second wave, and means to produce said modulations in like sense at one point of said anode circuit and unlike sense at another point of said anode circuit, and to eliminate said square wave pulse from a third point of said circuit while maintaining said second wave at said third point.

7. In combination, a pair of electron discharge devices each having an anode circuit, a cathode and at least one input electrode, said anode circuits having resistances individual thereto and a resistance common thereto, means to supply a wave comprising recurrent groups of pulses between the input electrodes and cathode of one of said devices and a wave comprising recurrent pulses, one pulse occurring during each of said groups, between the cathode and input electrode of both of said devices, means to bias said one device to prevent anode current flow therein, a pair of load circuits connected to different points on that one of said individual impedances in the anode circuit of said one device, said impedances being so proportioned and said waves so polarized that said first wave is reproduced in said load circuits only during the pulses of the other wave and said pulses of said other wave are reproduced in the same sense as said first wave in one of said circuits and in the sense opposite said first wave in the other circuit.

8. In combination, a pair of electron discharge devices, each having an anode, a cathode, and a control electrode, circuits respectively between said anodes and cathodes, said circuits having a resistance and source of operating potential common thereto and one of said circuits having a resistance individual thereto, means to supply pulses to one of said control electrodes in positive sense and to the other of said electrodes simultaneously therewith in negative sense, whereby said pulses appear as potential variations in opposite sense at different points on said individual resistance, and load circuits connected to receive potential variations from said different points respectively.

9. In combination, a pair of electron discharge devices, each having an anode, a cathode, and a control electrode, circuits respectively between said anodes and cathodes, said circuits having a resistance and source of operating potential common thereto and one of said circuits having a resistance individual thereto, means to supply simultaneously occurring pulses to one of said control electrodes in positive sense and to the other of said electrodes in negative sense, whereby said pulses appear as potential variations in opposite sense at different points on said individual resistance, and means to supply additional potential variations during said pulses to said one of said devices, whereby one of said potential variations is modulated in aiding relation and the other in opposed relation by said additional potential, and load circuits connected to said points.

10. In combination, a pair of electron discharge devices, each having an anode, a cathode, and a control electrode, circuits respectively between said anodes and cathodes, said circuits having a resistance and source of operating potential common thereto and one of said circuits having a resistance individual thereto, means to supply simultaneously occurring pulses to one of said control electrodes in positive sense and to the other of said electrodes in negative sense, whereby said pulses appear as potential variations in opposite sense at different points on said individual resistance, and means to supply additional potential variations during said pulses to said one of said devices, whereby one of said potential variations is modulated in aiding relation and the other in opposed relation by said additional potential, load circuits connected to said points, and an additional load circuit connected to said individual resistance at a point intermediate said points where variations in accordance with said pulses are absent.

FRANKLIN M. DEERHAKE.

REFERENCES CITED

The following references are of record in the file of this patent:

UNITED STATES PATENTS

| Number | Name | Date |
|---|---|---|
| 2,077,271 | Schlesinger | Apr. 13, 1937 |
| 2,264,197 | Hadfield | Nov. 25, 1941 |
| 1,343,306 | Carson | June 15, 1920 |
| 2,120,882 | Ballantine | June 14, 1938 |